(12) United States Patent
Wong

(10) Patent No.: US 9,294,483 B2
(45) Date of Patent: Mar. 22, 2016

(54) METHOD AND SYSTEM FOR MITIGATION OF DISTRIBUTED DENIAL OF SERVICE (DDOS) ATTACKS

(71) Applicant: John Wong, Newton, PA (US)

(72) Inventor: John Wong, Newton, PA (US)

( * ) Notice: Subject to any disclaimer, the term of this patent is extended or adjusted under 35 U.S.C. 154(b) by 0 days.

(21) Appl. No.: 14/270,133

(22) Filed: May 5, 2014

(65) Prior Publication Data

US 2014/0331304 A1 Nov. 6, 2014

Related U.S. Application Data

(60) Provisional application No. 61/819,489, filed on May 3, 2013.

(51) Int. Cl.
*H04L 29/06* (2006.01)
(52) U.S. Cl.
CPC .......... *H04L 63/101* (2013.01); *H04L 63/0218* (2013.01); *H04L 63/1458* (2013.01)

(58) Field of Classification Search
CPC combination set(s) only.
See application file for complete search history.

(56) References Cited

U.S. PATENT DOCUMENTS

| 7,548,945 | B2 | 6/2009 | Asnis | |
|---|---|---|---|---|
| 7,849,502 | B1 | 12/2010 | Bloch et al. | |
| 8,209,415 | B2 | 6/2012 | Wei | |
| 8,423,672 | B2 | 4/2013 | Liu et al. | |
| 2006/0023638 | A1* | 2/2006 | Monaco et al. | 370/252 |
| 2008/0168558 | A1 | 7/2008 | Kratzer et al. | |
| 2008/0276313 | A1* | 11/2008 | Kummu et al. | 726/22 |
| 2012/0079592 | A1 | 3/2012 | Pendrangi | |

FOREIGN PATENT DOCUMENTS

CN 101945041 A 1/2011

* cited by examiner

*Primary Examiner* — Ghazal Shehni
(74) *Attorney, Agent, or Firm* — Cozen O'Connor

(57) ABSTRACT

A system and method for mitigating the effects of malicious internet traffic, including DDOS attacks, by utilizing a DNS Traffic Analyzer and Firewall to analyze network traffic intended for a DNS server and preventing some network traffic from accessing the DNS server.

16 Claims, 2 Drawing Sheets

METHOD AND SYSTEM FOR MITIGATION OF DISTRIBUTED DENIAL OF SERVICE (DDOS) ATTACKS

CROSS-REFERENCE TO RELATED APPLICATIONS

This application claims priority from U.S. Provisional Application Ser. No. 61/819,489 filed May 3, 2013, the disclosure content of which is hereby incorporated by reference in its entirety.

BACKGROUND OF THE INVENTION

1. Field of the Invention

The present invention generally relates to the field of internet traffic and, more particularly, to a system and method for controlling internet traffic to mitigate effects of malicious traffic, including distributed denial of service (DDOS) attacks.

2. Description of the Related Art

Computers connected via a network, such as the Internet, are identified by a unique identifier. For most computers, which use the Transmission Control Protocol/Internet Protocol (TCP/IP), this unique identifier is called an internet protocol address, or IP address. IP addresses can be static or, more commonly, dynamic.

Generally, a first computer on a network can attempt to access a second computer on the same network directly, via the second computer's IP address. More commonly, the user of a first computer will only know the "name" of the intended destination, not the IP address of the destination. Using the Domain Name System, or DNS, the user of the first computer can access the destination without knowledge of the destination's IP address.

The DNS uses a process called DNS name resolution to find a specific IP address, given a particular domain name. For example, if a user was attempting to access the domain example.com, the user would enter the name into a web browser's address bar, and the DNS would resolve the IP address for that domain.

The DNS has a hierarchical structure and utilizes a large number of DNS servers that store records for a given domain name and respond with answers to queries, such as asking for the IP address for a given domain name.

An authoritative DNS server is a DNS server that gives answers in response to queries for a particular DNS zone. Every domain name appears in a zone that is served by at least one authoritative name server.

If a particular DNS server cannot answer a query, it may query other DNS servers that are higher up in the hierarchy by performing a reverse look-up. The number of DNS servers has grown as use of the Internet has expanded.

Many devices have been developed to protect servers and networks from malicious attacks coming from the Internet. Typically, these devices fall into the category of firewalls and specialized routers. Generally, a firewall is any security system that controls network traffic by applying a set of rules. Essentially, a firewall is a barrier between a secure network and another, unsecure network (i.e., the Internet).

Internet traffic can also be regulated using white lists, black lists, and/or grey lists to manage a set of allowed or denied users. For example, U.S. Pat. No. 7,849,502 and U.S. Patent Application Publication Nos. 2012/0079592 and 2008/0168558 describe the creation, management, and use of various types of white, black, and grey lists.

Each and every reference cited herein is hereby incorporated by reference in its entirety, where appropriate, for teachings of additional or alternative details, features, and/or technical background.

Firewalls and specialized routers may typically utilize source IP detection, packet and content analysis, traffic pattern analysis, and an array policies and rules to filter out malicious traffic and content. Some devices are scalable to handle higher levels of traffic and larger scale malicious attacks.

One type of Internet-based attack is a DDOS attack. Generally, a DDOS attack is an attempt to make a target computer or server unavailable to its intended users by preventing the target from functioning. During a DDOS attack, the attacker(s) generate a large volume of connection attempts directed at the target's IP address or addresses. Commonly, these connection attempts are directed at the target's authoritative DNS servers. The intended result of such a large number of connection attempts is that the target is overloaded such that it is unable to service legitimate connection attempts from valid users.

Some DDOS attacks can be defended via traditional methods such as firewalls. However, in recent years, the scale of some DDOS attacks has become unprecedentedly large and long in duration, overwhelming the capabilities and resources of the largest and most powerful firewalls and defense systems.

SUMMARY OF THE INVENTION

Embodiments of the present invention relate to the internet, and more particularly to methods and systems for mitigating malicious internet traffic, such as DDOS attacks.

Some embodiments of the present invention relate to a system for mitigating malicious network traffic comprising a protected server within a domain, at least one Authoritative DNS server of the domain, and at least one DTAF Firewall, wherein network traffic must pass through the DTAF Firewall(s) before accessing the Authoritative DNS server(s), and wherein the DTAF Firewall(s) analyzes the network traffic attempting to pass through the DTAF Firewall. Some embodiments further comprise a Central Master DTAF, wherein the DTAF Firewall(s) send network traffic data to the Central Master DTAF, and wherein the Central Master DTAF sends at least one access control list to the DTAF Firewall(s).

Some embodiments further comprise a system wherein network traffic must also pass through the DTAF Firewall(s) before accessing the protected server and/or public DNS servers.

Some embodiments further comprise a domain shifting subsystem, wherein the domain shifting subsystem creates New Authoritative DNS servers and reroutes at least some network traffic to the New Authoritative DNS servers. In some embodiments, the domain shifting subsystem rotates the Authoritative DNS Servers on a regular basis. In some embodiments, new Authoritative DNS server(s) process new network traffic. In other embodiments, only white-listed traffic is processed by the New Authoritative DNS Server(s). In still other embodiments, only suspicious network traffic is processed by the New Authoritative DNS Server(s).

DETAILED DESCRIPTION OF THE EXEMPLARY EMBODIMENTS

Figure 1:
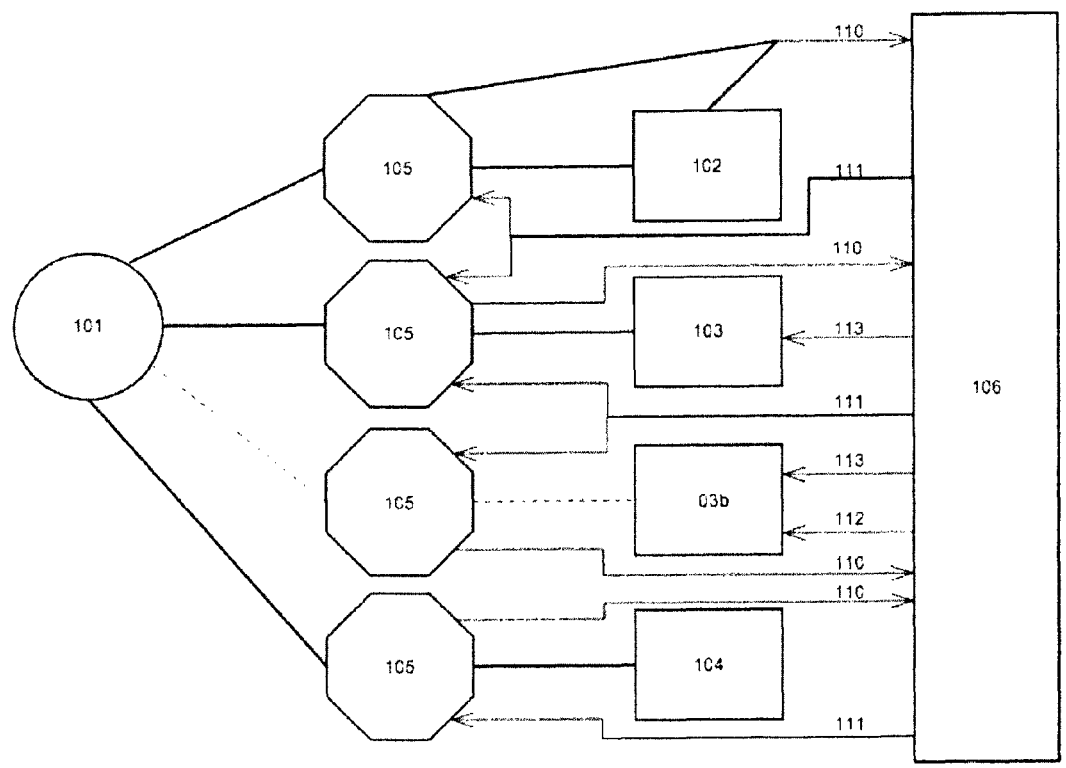
FIG. 1 is a simplified block diagram depicting an embodiment of the invention.

FIG. 1 is a simplified block diagram depicting an embodiment of the invention described herein. Clients 101, either legitimate or malicious, access a protected server 102 via a network, such as the public internet. A protected server 102 could be a web server, email server, application server, or any other type of server that can be accessed via the public internet or any other network.

In the embodiment of FIG. 1, traffic intended for the protected server 102, the Domain's Authoritative DNS servers 103, or public DNS servers 104 must first pass through DTAF Firewalls 105. Other embodiments are envisioned in which DTAF Firewalls 105 are placed only between a subset of these destinations.

Generally, a DTAF (DNS Traffic Analyzer and Firewall) is capable of analyzing data received from the internet, and optimizing a firewall based upon the analysis. For example, in some embodiments, DTAF Firewalls utilize DNS and application log archives and analysis of realtime logs to track and analyze visitors by IP address, subnet, and or those visitors' DNS servers.

Using the archived and realtime data, the DTAF can keep an updated, realtime ACL (access control list), which effectuates the diversion of traffic to the firewall or to routers. The realtime ACL can use a combination of white lists, black lists, and grey lists to dynamically maintain a list of accepted and rejected clients. The general application of firewalls and specialized routers to prevent or mitigate malicious attacks are well known to those of skill in the art.

In some embodiments, the DTAF is capable of using references and DNS look-ups to determine the DNS servers of visitors. Thus, the ACL can also maintain a list of allowed and denied DNS servers (or, a DNS-ACL). The DNS-ACL can then be fed back to routers and firewalls to block suspicious DNS sources.

In some embodiments, the DTAF Firewall is capable of allowing, blocking, or modifying DNS queries and/or reply data. Thus, using the DNS-ACL, the DTAF can allow or reject individual IP addresses or all addresses from a particular DNS server. It is further envisioned that gray-listed addresses or DNS servers could be wait-listed for further analysis, especially during times of unusually high traffic, such as during a DDOS attack.

In the embodiment of FIG. 1, the DTAF Firewalls 105 and the protected server 102 send traffic data 110, including realtime information and historic data regarding IP addresses or DNS servers, to the Central Master DTAF 106. The traffic data 110 can include a variety of information, including but not limited to date and time information, source ip address, request frequency, request patterns, and packet content data.

The Central Master DTAF 106 of FIG. 1 analyzes the traffic data 110 and derives an ACL, based upon a white-list that includes the likely legitimate (non-malicious) set of source ip addresses (or DNS servers). Additionally, or in the alternative, the ACL may contain a black list and/or grey list. The Central Master DTAF 106 can better perform the functions of individual DTAF Firewalls 105, because the Central Master DTAF 106 receives data from multiple sources, such as the protected server 106, the Domain's Authoritative DNS servers, the public DNS servers, and their respective DTAF Firewalls 105.

The Central Master DTAF 106 sends DTAF-ACL 111 to the DTAF Firewalls 105. The DTAF-ACL 111 can include information regarding clients, their DNS servers, or both. Regarding a DTAF-ACL 111 for DNS servers, the Central Master DTAF can derive this information by, for example, performing a reverse look-up to determine the relevant subnet and authoritative ISP for the client address, and finally the ISP's assigned and published DNS servers assigned to the client address. Once received by the DTAF Firewalls 105, the DNS DTAF-ACL 111 can be used to mitigate malicious traffic by denying server IP address lookup via controlling the lookup of the address of a protected server 102 by public DNS servers that are included in the DNS DTAF-ACL.

In the embodiment of FIG. 1, the Central Master DTAF 106 can create 112 new DNS servers to be used as the Domain's New Authoritative DNS Servers (or New DNS Servers) 103b. In other embodiments, this and other functions are performed by components other than the Central Master DTAF 106. In the FIG. 1 embodiment, the Central Master DTAF 106 generates a DNS zone file for the protected domain with given TTL (time to live) and TTR (time to refresh) values. The zone file is then propagated to the original set of the Domain's Authoritative DNS Servers 103.

Generally, TTL and TTR rates can be on the order of hours long, but it is envisioned that varying live and refresh rates, such as 1 hour, 45 minutes, 30 minutes, 10 minutes, 5 minutes, 1 minutes, 30 seconds, or less, can be utilized to optimize functionality of the system under a heavy DDOS attack.

By creating 113 the New DNS Servers 103b, the Central Master DTAF 106 can utilize DNS shifting to further mitigate potential damage from malicious clients. This can be performed in a number of ways. For example, before the TTL of the new DNS zone file expires, the Central Master DTAF can create 112 the New DNS Servers 103b and delegate the domain name to these New DNS Servers 103b. The original Authoritative DNS Servers 103 would continue to service requests that are directed to them (usually up to the duration time defined by TTL). The New DNS Servers 103b would receive DNS requests from newly refreshed DNS servers seeking the domain name. The New DNS Servers 103b will continue to receive requests up to their TTL for recently serviced DNS servers.

The process outlined above can be repeated many times, which would result in spreading DNS request traffic across the New DNS Servers 103b. In effect, creating 112 New DNS Servers 103b in this manner allows the diffusion of DNS request traffic over more authoritative DNS servers than is specified by the maximum number of authoritative DNS servers at the Internet Registry or Root.

Traffic distribution can be facilitated via DNS rotation and DNS caching. In FIG. 1, this is accomplished by the Central Master DTAF 106, which updates DNS zones by rotating 113 the Domain's Authoritative DNS Servers 103, 103b. In some embodiments, the Central Master DTAF 106 changes the authoritative DNS on a regular rapid basis, after time period T. DNS records would be maintained and changed on a regular basis T2, with a TTL and refresh values less than T. The Central Master DTAF would then rotate the authoritative DNS lists and DNS records.

In various embodiments, DNS shifting can work in a number of different ways using a variety of ACL's, white lists, black lists, and grey lists. For example, the Central Master DTAF 106 could publish its new DNS location to clients or DNS's on the white list. All other clients (new, grey-listed, etc.) could thus be blocked from accessing the server. Such an approach would be especially useful during DDOS attacks when sacrificing some legitimate clients is preferable to receiving the full force of the attack. In some embodiments, new, white-listed, and grey-listed clients (or DNS servers) may be partitioned such that preferred traffic can proceed normally, while more suspicious traffic can be spread out among a number of new DNS servers to diffuse the attack and increase the effectiveness of firewalls and specialized routers, or to focus additional analysis on suspicious clients.

Figure 2:
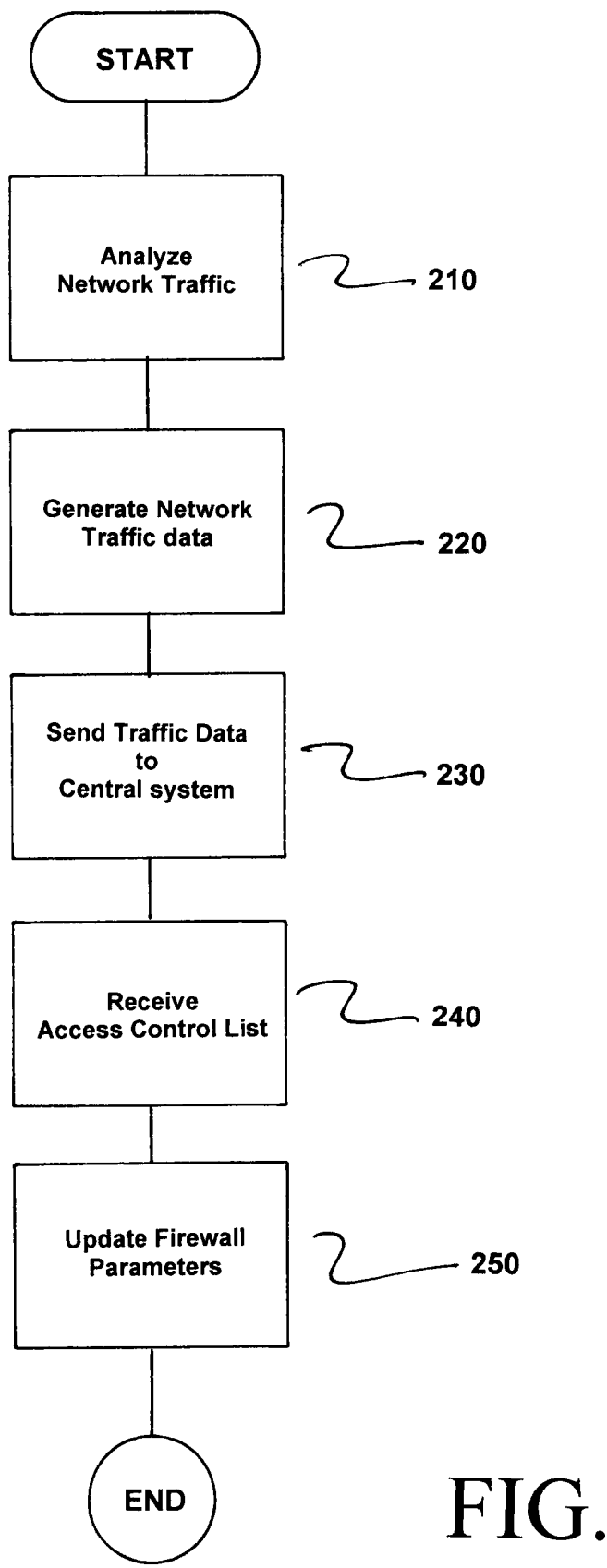
FIG. 2 is a flowchart of the method in accordance with an embodiment of the invention.

FIG. 2 is a flowchart of a method for mitigating malicious network traffic. The method comprises analyzing network traffic intended for at least one Authoritative Domain Name System (DNS) server, as indicated in step 210. Next, network traffic data is generated, as indicated in step 220. The network traffic data is then sent to a central system, as indicated in step 230. An access control list is now received from the central system, as indicated in step 240. Firewall parameters are then updated based upon the received access control list, as indicated in step 250.

The invention being fully described, one of ordinary skill in the art can see how the interplay of client and DNS ACLs, DTAFs, DNS shifting, and Central Master DTAFs can be selectively combined to produce a number of flexible solutions depending on the financial, security, access, and control needs relating to a particular protected server.

What is claimed is:

1. A system for mitigating malicious network traffic, comprising: a protected server within a domain; at least one Authoritative Domain Name System (DNS) server of the domain; at least one DNS Traffic Analyzer and Firewall (DTAF), wherein network traffic must pass through the at least one DTAF Firewall before accessing the at least one Authoritative DNS server, and wherein the at least one DTAF Firewall analyzes the network traffic attempting to pass through the at least one DTAF Firewall; and a Central Master DTAF, wherein the at least one DTAF Firewall send network traffic data to the Central Master DTAF, and wherein the Central Master DTAF sends at least one access control list to the at least one DTAF Firewall.

2. The system of claim 1, wherein network traffic must also pass through the at least one DTAF Firewall before accessing the protected server.

3. The system of claim 1, wherein network traffic must also pass through the at least one DTAF Firewall before accessing public DNS servers.

4. The system of claim 1, wherein the network traffic data includes both historical data and realtime data.

5. The system of claim 1, wherein the protected server sends network traffic data to the Central Master DTAF.

6. The system of claim 1, wherein the at least one Authoritative DNS Server send network traffic data to the Central Master DTAF.

7. The system of claim 1, wherein the access control list(s) include information related to a specific DNS Server and wherein the at least one DTAF Firewall is capable of controlling or analyzing traffic originating from the specific DNS Server.

8. The system of claim 1, further comprising a domain shifting subsystem, wherein the domain shifting subsystem creates at least one New Authoritative DNS server and reroutes at least some network traffic to the at least one New Authoritative DNS server.

9. The system of claim 8, wherein the domain shifting subsystem rotates the at least one New Authoritative DNS Server on a regular basis.

10. The system of claim 8, wherein the at least one New Authoritative DNS server process new network traffic.

11. The system of claim 1, wherein the enhanced and dynamic access control list contains a list of denied IP addresses that are prohibited from passing through to the protected system and allowed IP addresses that are allowed to pass through to the protected system, wherein such allowed and denied IP addresses are based not only upon source address of the attack traffic, but also IP addresses belonging to public and private DNS servers and DNS resolvers identified as relied upon by the attacker(s) to find the target protected system, such identification done via an analysis of network traffic at the attack target as well and at distributed DTAF systems that are not under attack, such as public Internet Service Provider (ISP) DNS servers.

12. The system of claim 11, wherein the access control list further defines wherein the identified IP addresses originating not from the attack source are selectively allowed or denied in accordance with the blocking or redirection strategy currently engaged in the overall DTAF system.

13. A method for mitigating malicious network traffic, comprising the following steps:
    analyzing network traffic intended for at least one Authoritative Domain Name System (DNS) server;
    generating network traffic data;
    sending the network traffic data to a Central Master DTAF;
    receiving an access control list from the Central Master DTAF; and
    updating firewall parameters based upon the received access control list.

14. The method of claim 13, further comprising the following steps:
    determining a particular DNS server utilized by suspicious network traffic;
    including DNS server data in the network traffic data; and
    including DNS server information in the access control list.

15. The method of claim 13, further comprising the following steps:
    creating at least one New Authoritative DNS server; and
    routing at least some of the network traffic to the at least one New Authoritative DNS serve.

16. The method of claim 13, further comprising the following step:
    rotating the Authoritative DNS servers on a regular basis.

* * * * *

UNITED STATES PATENT AND TRADEMARK OFFICE
CERTIFICATE OF CORRECTION

PATENT NO. : 9,294,483 B2
APPLICATION NO. : 14/270133
DATED : March 22, 2016
INVENTOR(S) : John Wong It is certified that error appears in the above-identified patent and that said Letters Patent is hereby corrected as shown below:

In the Claims

Column 5, Claim 6, line 49 - change the word "send" to read --sends--.

Column 6, Claim 10, line 10 - change the word "process" to read --processes--.

Column 6, Claim 15, line 49 - change the word "serve" to read --server--.

Signed and Sealed this
Seventh Day of June, 2016

Michelle K. Lee
*Director of the United States Patent and Trademark Office*